United States Patent
Gibson et al.

(10) Patent No.: US 9,940,661 B2
(45) Date of Patent: Apr. 10, 2018

(54) METHOD AND APPARATUS FOR RECOMMENDING A FOOD ITEM

(71) Applicant: Xerox Corporation, Norwalk, CT (US)

(72) Inventors: George A. Gibson, Fairport, NY (US); Wendell L. Kibler, Rochester, NY (US); Denise L. Fletcher, Simsbury, CT (US)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 710 days.

(21) Appl. No.: 14/218,532

(22) Filed: Mar. 18, 2014

(65) Prior Publication Data

US 2015/0269645 A1  Sep. 24, 2015

(51) Int. Cl.
| | |
|---|---|
| *G06Q 30/02* | (2012.01) |
| *G06Q 30/06* | (2012.01) |
| *G06Q 50/12* | (2012.01) |
| *G09B 5/02* | (2006.01) |

(52) U.S. Cl.
CPC ......... *G06Q 30/0631* (2013.01); *G06Q 30/06* (2013.01); *G06Q 30/0639* (2013.01); *G06Q 50/12* (2013.01); *G09B 5/02* (2013.01)

(58) Field of Classification Search
CPC ................................................. G06Q 30/0255
See application file for complete search history.

(56) References Cited

U.S. PATENT DOCUMENTS

| | | | | |
|---|---|---|---|---|
| 6,587,835 | B1 * | 7/2003 | Treyz | G06Q 20/12 705/14.64 |
| 6,954,735 | B1 * | 10/2005 | Djupsjobacka | G06Q 30/06 701/533 |
| 7,822,635 | B1 * | 10/2010 | Brown | G06Q 30/02 705/14.1 |
| 7,953,873 | B1 * | 5/2011 | Madurzak | G06Q 30/02 705/15 |
| 8,065,235 | B2 * | 11/2011 | Narayanaswami | G06Q 10/087 705/26.82 |
| 8,266,027 | B2 * | 9/2012 | Moritz | G06Q 30/00 235/385 |
| 8,494,896 | B1 * | 7/2013 | Lagana | G06Q 10/10 705/7.29 |
| 8,836,580 | B2 * | 9/2014 | Mendelson | G01C 21/206 342/450 |
| 2002/0165778 | A1 * | 11/2002 | O'Hagan | G06K 7/0004 705/14.25 |

(Continued)

FOREIGN PATENT DOCUMENTS

WO  WO 2013/052081 A2 *  4/2013  ............. G06Q 30/02

OTHER PUBLICATIONS

Abhaya Asthana et al. (1995). An indoor Wireless System for Personlized Shopping Assistance. IEEE.*

*Primary Examiner* — Peter L Ludwig

(57) ABSTRACT

A method, non-transitory computer readable medium, and apparatus for recommending a food item are disclosed. For example, the method receives one or more food item data communications over a short range communications protocol that are pushed to a mobile endpoint device, filters the one or more food item data communications in accordance with a food item filter pre-defined by a user to identify an acceptable food item to recommend to the user and recommends the acceptable food item to the user.

12 Claims, 5 Drawing Sheets

(56) References Cited

U.S. PATENT DOCUMENTS

| | | | | | |
|---|---|---|---|---|---|
| 2005/0256781 | A1* | 11/2005 | Sands | G06Q 10/087 | 705/26.8 |
| 2009/0075242 | A1* | 3/2009 | Schwarzberg | G09B 19/0092 | 434/127 |
| 2009/0234700 | A1* | 9/2009 | Galvin | G06Q 30/0601 | 705/26.9 |
| 2009/0275002 | A1* | 11/2009 | Hoggle | G09B 19/0092 | 434/127 |
| 2009/0276300 | A1* | 11/2009 | Shaw | G06Q 20/102 | 705/14.1 |
| 2010/0161434 | A1* | 6/2010 | Herwig | G06Q 20/201 | 705/20 |
| 2010/0262554 | A1* | 10/2010 | Elliott | G01C 21/20 | 705/323 |
| 2011/0112904 | A1* | 5/2011 | Stupp | G06Q 30/02 | 705/14.58 |
| 2012/0088487 | A1* | 4/2012 | Khan | H04W 4/001 | 455/418 |
| 2012/0277991 | A1* | 11/2012 | Wagner | G06Q 30/00 | 701/410 |
| 2013/0054363 | A1* | 2/2013 | Sasankan | G06Q 30/0259 | 705/14.54 |
| 2013/0210461 | A1* | 8/2013 | Moldaysky | G06Q 30/0261 | 455/456.3 |
| 2013/0211814 | A1* | 8/2013 | Derks | G06Q 30/02 | 704/2 |
| 2013/0246146 | A1* | 9/2013 | Fischer | G06Q 30/0222 | 705/14.23 |
| 2013/0282522 | A1* | 10/2013 | Hassan | G06Q 10/087 | 705/26.9 |
| 2013/0282533 | A1* | 10/2013 | Foran-Owens | G06Q 30/0641 | 705/27.1 |
| 2013/0297422 | A1* | 11/2013 | Hunter | G06Q 30/0261 | 705/14.58 |
| 2014/0058886 | A1* | 2/2014 | Gopalakrishnan | G06Q 30/02 | 705/26.8 |
| 2014/0095349 | A1* | 4/2014 | Mabrey | G06Q 30/0643 | 705/26.8 |
| 2014/0164122 | A1* | 6/2014 | Wissner-Gross | G06Q 30/0261 | 705/14.58 |
| 2014/0188658 | A1* | 7/2014 | Li | G06Q 30/0633 | 705/26.8 |
| 2014/0207615 | A1* | 7/2014 | Li | G06Q 30/0623 | 705/26.61 |
| 2014/0279014 | A1* | 9/2014 | Roka | G06Q 30/0261 | 705/14.58 |
| 2015/0206450 | A1* | 7/2015 | Wayman | G06Q 30/0631 | 434/127 |
| 2016/0171475 | A1* | 6/2016 | Hughes | G06Q 30/0259 | 455/456.3 |

* cited by examiner

METHOD AND APPARATUS FOR RECOMMENDING A FOOD ITEM

The present disclosure relates generally to aiding shoppers in a grocery store or a restaurant and, more particularly, to a method and apparatus for recommending a food item.

BACKGROUND

Consumers are becoming more conscious of the food items they consume. Consumers with specific disease states, nutritional objectives and/or goals encounter significant inconvenience and costs during shopping and/or dining.

Food items are typically packaged with a description of the ingredients and nutritional information in a nutritional label. However, the nutritional label may be small, obscure and difficult to read. As a result, it may be difficult for consumers to understand or decipher the information contained in the nutritional label.

For example, the nutritional label may contain ingredients that consumers are unfamiliar with, deceptive nutritional information based on serving sizes, and the like. Consequently, consumers may not know how a food item fits within their nutritional objectives or goals based on reading the nutritional information.

SUMMARY

According to aspects illustrated herein, there are provided a method, a non-transitory computer readable medium, and an apparatus for recommending a food item. One disclosed feature of the embodiments is a method that receives one or more food item data communications over a short range communications protocol that are pushed to a mobile endpoint device, filters the one or more food item data communications in accordance with a food item filter pre-defined by a user to identify an acceptable food item to recommend to the user and recommends the acceptable food item to the user.

Another disclosed feature of the embodiments is a non-transitory computer-readable medium having stored thereon a plurality of instructions, the plurality of instructions including instructions which, when executed by a processor, cause the processor to perform an operation that receives one or more food item data communications over a short range communications protocol that are pushed to a mobile endpoint device, filters the one or more food item data communications in accordance with a food item filter pre-defined by a user to identify an acceptable food item to recommend to the user and recommends the acceptable food item to the user.

Another disclosed feature of the embodiments is an apparatus comprising a processor and a computer readable medium storing a plurality of instructions which, when executed by the processor, cause the processor to perform an operation that receives one or more food item data communications over a short range communications protocol that are pushed to a mobile endpoint device, filters the one or more food item data communications in accordance with a food item filter pre-defined by a user to identify an acceptable food item to recommend to the user and recommends the acceptable food item to the user.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer-readable medium for recommending a food item. As discussed above, consumers are becoming more conscious of the food items they consume. Food items are typically packaged with a description of the ingredients and nutritional information in a nutritional label. However, the nutritional label may be small, obscure and difficult to read. As a result, consumers may not know how a food item fits within their nutritional objectives or goals based on reading the nutritional information.

One embodiment of the present disclosure addresses this problem by providing a method and apparatus that automatically pushes to a user's mobile endpoint device all food items suitably equipped to transmit the respective food items identity, ingredients, associated nutritional information, location, and the like. The user's mobile endpoint device may filter the information and display notifications of food items that are compatible with a user's dietary restrictions and/or goals. As a result, a user does not have to manually scan and review each food item to determine whether a food item is acceptable. Rather, the food items reach out to the user via short range communications protocols (e.g., near field communications, blue tooth, iBeacon, wireless fidelity (WiFi), and the like) between tags on shelf (e.g., a shelf talker system) and the mobile endpoint device.

Thus, by pushing out food items to the user, as opposed to manually scanning items, the user may be introduced to food items that the user never considered before that meet the user's dietary restrictions as the user walks down an aisle of the grocery store. In contrast, manually scanning items would require the user to know what the user is looking for ahead of time and research the food before going to the grocery store.

The user may pre-define a food item filter in accordance with his or her dietary restrictions, preferences or goals. Based on the food item filter pre-defined by the user the multitude of food item data communications pushed to the mobile endpoint device of the user as the user walks down an aisle of a grocery store or reads over a menu at a restaurant may be filtered to identify those food items that meet the user's dietary restrictions based on the food item filter. The appropriate food items may then be displayed to the user via his or her mobile endpoint device.

Figure 1:
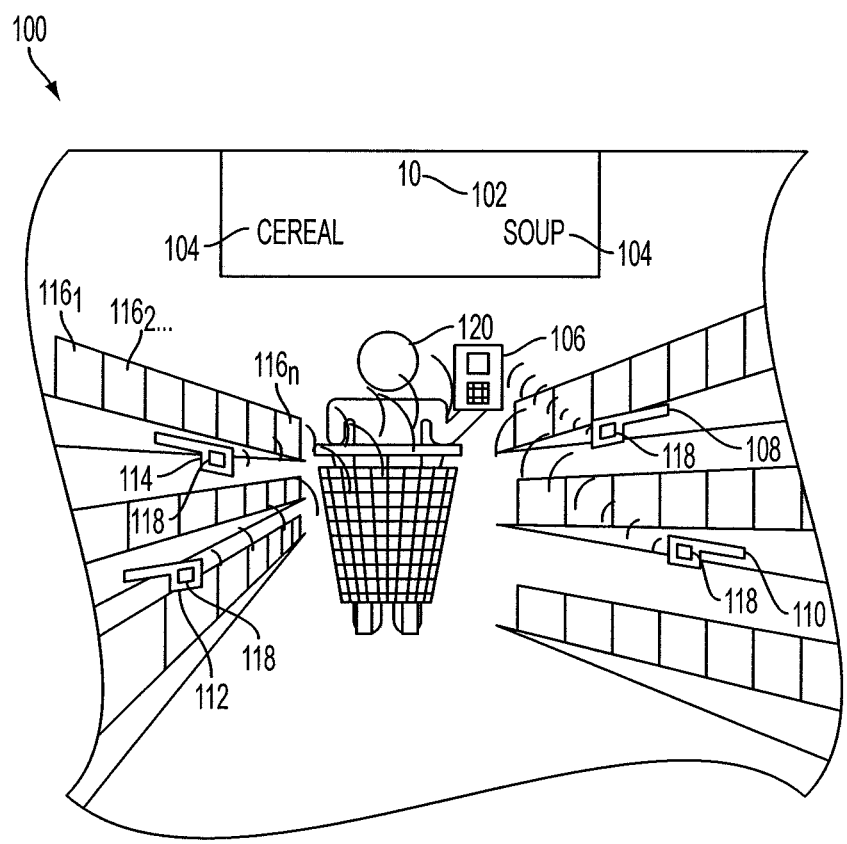
FIG. 1 illustrates an example block diagram of a system of the present disclosure.

FIG. 1 illustrates an example system 100 of the present disclosure. In one embodiment, the system 100 may include a mobile endpoint device 106 and one or more shelf talkers 108, 110, 112 and 114. In one embodiment, the mobile endpoint device 106 may be any type of mobile endpoint device, such as for example, a mobile telephone, a smart phone, a lap top computer, a tablet computer, and the like.

In one embodiment, the one or more shelf talkers 108, 110, 112 and 114 may include a tag 118. It should be noted that although four shelf talkers are illustrated in FIG. 1 any number of shelf talkers may be deployed. Each shelf talker 108, 110, 112 and 114 may be associated with a different food item $116_1$ to $116_n$ (also referred to herein as food item or food items 116).

In one embodiment, the tag 118 may be a passive communication tag that emits data over a short range communications protocol. For example, the tag 118 may be a near field communications (NFC) tag that communicates using NFC protocols. However, it should be noted that any type of short range communications protocol may be deployed (e.g., Bluetooth®, WiFi, and the like).

In one embodiment, the shelf talkers 108, 110, 112 and 114 may be designed as a flag that sticks out of an aisle 102 of a grocery store and may be associated with a respective food item 116. The tag 118 of the shelf talkers 108, 110, 112 and 114 may be programmed with detailed information about the respective food item 116. For example, the detailed information may include a location of the food item 116 within the grocery store, a price of the food item 116, a list of ingredients of the food item 116, a copy of the nutritional facts label of the food item 116, which food category 104 is associated with the food item 116, and the like.

In one embodiment, the tag 118 of the shelf talkers 108, 110, 112 and 114 may transmit the detailed information about the respective food item 116 to the mobile endpoint device 106 as a user 120 walks down the aisle 102. The mobile endpoint device 106 may then filter the information received from a plurality of different shelf talkers 108, 110, 112 and 114 in accordance with one or more food item filters defined by the user 120 in the mobile endpoint device 106, as described below.

Although only a single aisle 102 is illustrated in FIG. 1, it should be noted that the grocery store may have a plurality of different aisles 102. Each aisle 102 may be organized by one or more different food categories 104. For example, in FIG. 1 the right side of the user 120 may contain cereals and the left side of the user 120 may include soups.

The food categories 104 may be used to help filter what food items 116 are displayed to the user 120 via the mobile endpoint device 106. For example, all of the tags 118 of the different shelf talkers 108, 110, 112 and 114 may be communicating with the mobile endpoint device 106. However, to prevent the user 120 and/or the mobile endpoint device 106 from being overwhelmed with a barrage of information from all of the tags 118, the mobile endpoint device 106 may be linked to a grocery shopping list (e.g., from a grocery shopping list program or application). Each food item 116 in the grocery shopping list may be associated with a food category 104. Thus, only food items that meet the food item filters defined by the user 120 in the mobile endpoint device 106 for a food category 104 in the grocery shopping list may be displayed on the mobile endpoint device 106.

For example, if the user 120 has a can of soup on a grocery list, then the mobile endpoint device 106 would only display information from the tags 118 of the shelf talkers 108 and 110 of the soup food category 104. In contrast, the user 120 may have no cereals on the grocery list. Then the mobile endpoint device 106 would filter out the information sent by the tags 118 of the shelf talkers 112 and 114 in the cereal food category 104. In other words, even though all of the tags 118 of the shelf talkers 108, 110, 112 and 114 are sending information to the mobile endpoint device 106, the mobile endpoint device 106 is filtering the information that is pushed to the mobile endpoint device 106 such that only certain food items are recommended or displayed to the user 120. For example, a food item filter and/or a grocery list that is pre-defined by the user 120 may be used to perform the filtering, as discussed below.

In one embodiment, the tags 118 may be also placed on menus in a restaurant. For example, the tags 118 may continually transmit detailed information regarding each food item listed on the menu. The detailed information may include a number of calories, a list of ingredients, detailed nutritional data, and the like. Thus, when the user 120 places his or her mobile endpoint device 106 near the tag 118 of the menu, the mobile endpoint device 106 may automatically display or recommend food items based on the food item filter pre-defined by the user 120.

The menu with the tag 118 may also be located outside on a window of the restaurant. As a result, as individuals walk by the restaurant with their mobile endpoint devices 106, the individuals can quickly see what food items are compatible with their food item filters without having to spend time looking at the menu one item at a time or going into the restaurant to decide if there is anything they can eat.

Figure 2:
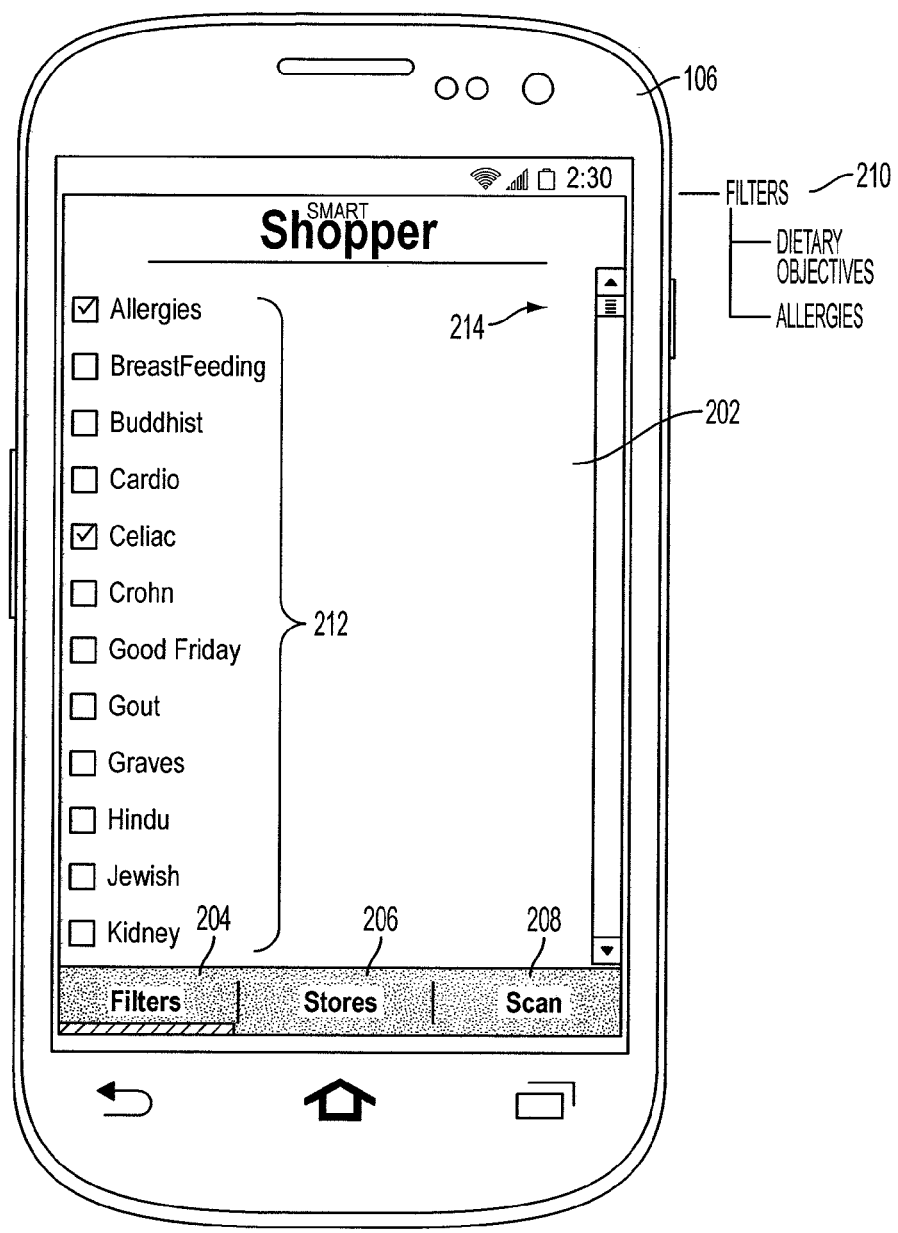
FIG. 2 illustrates an example screen shot of a filter menu of an application of the present disclosure on an endpoint device.
Figure 3:
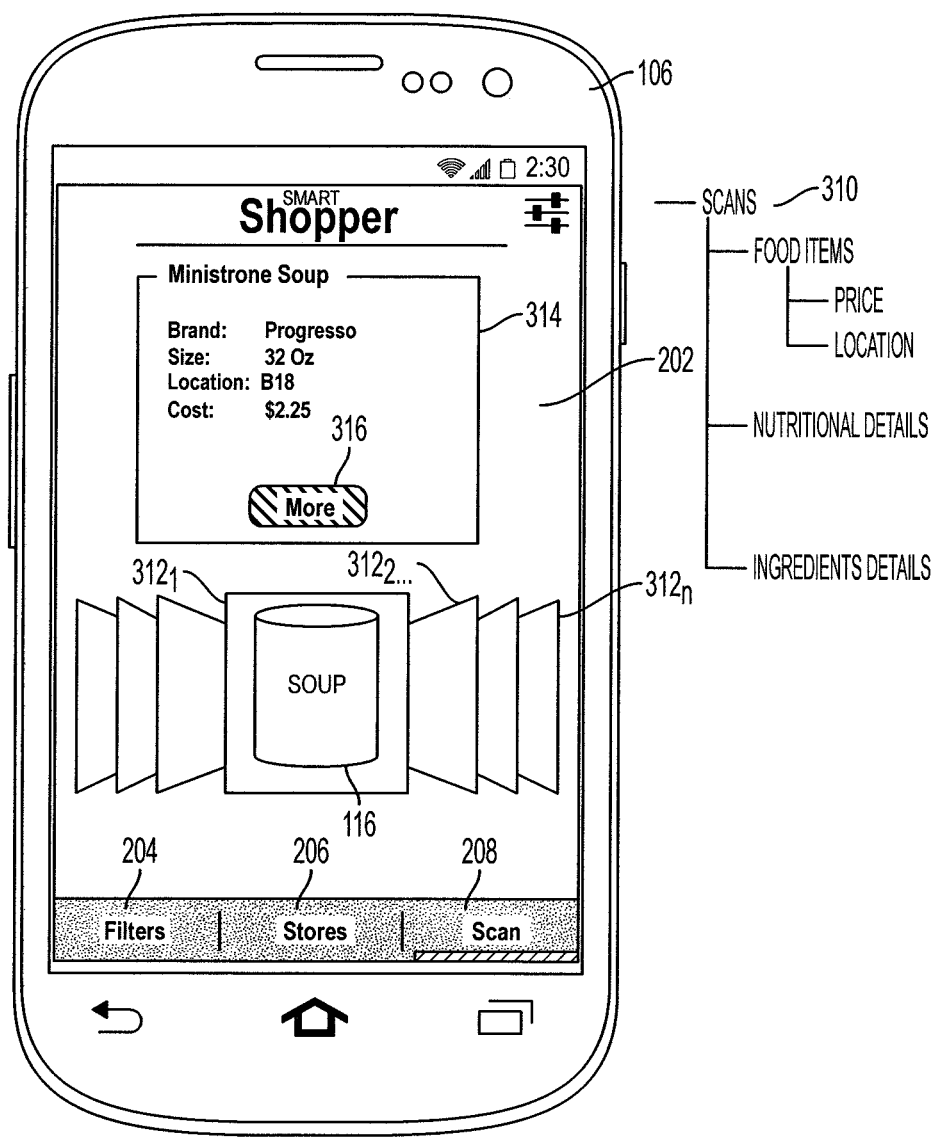
FIG. 3 illustrates an example screen shot of a scan menu of an application of the present disclosure on an endpoint device.

In one embodiment, the food item filter may be part of an application or a program 202 that is executed or run on the mobile endpoint device 106 as illustrated in FIGS. 2 and 3. The application 202 may include a filter menu 204, a store menu 206 and a scan menu 208. It should be noted that the displayed menus are only one example and should not be considered limiting. For example, the application 202 may include other menus or be arranged in any order.

FIG. 2 illustrates an example screen shot of the filter menu 204. In one embodiment, the filter menu 204 may be organized by an example layout 210. For example, the filter menu 204 may include submenus of dietary objectives and allergies. The dietary restrictions submenu may include general categories related to the user's religious preferences (e.g., Hindu, Jewish, etc.), cultural preferences (e.g., diets specific to a specific country), a physical state (e.g., pregnancy), dietary restrictions (e.g., gluten free, lactose free, sugar free, and the like) or diseases (e.g., gout, diabetes, hypertension, and the like).

In one embodiment, the allergies submenu may include specific food items that the user 120 is trying to avoid. In one embodiment, the foods may include specific foods for other reasons other than allergies. For example, the user 120 may simply want to avoid artificial sweeteners for health reasons.

In one embodiment, when the user 120 selects a dietary restriction, the application may automatically select one or more of the food items in the allergies submenu. For example, if the user 120 selects a dietary objective of diabetes, the application 202 may automatically select sugar in the allergy submenu or if the user 120 selects a dietary objective of pregnancy, the application 202 may automatically select foods containing nitrates, alcohol and the like. In another embodiment, the user 120 may manually select additional food items that the user 120 may be allergic to or trying to avoid.

As discussed above, in one embodiment, a grocery shopping list may be used in conjunction with the food item filter of the application 202. For example, the grocery shopping list may be a feature of the application 202 or may be imported from another application. The grocery shopping list may include one or more food items 116 and an associated food category for each one of the food items 116. As a result, the application 202 may then know what food items 116 the user 120 is shopping for and filter out information received from the shelf talkers 108, 110, 112 and 114 that are not in the food categories that the user 120 needs. In other words, the application 202 may only display the food items 116 that the user 120 needs within the food categories associated with the food items 116 of the grocery shopping list. As a result, the application 202 may display and recommend a streamlined list of food items 116 rather than a barrage of food items 116 that the user 120 may not be shopping for at the moment, even if the food item 116 passes the food item filter.

In one embodiment, the store menu 206 may include a list of stores nearby the user 120. For example, the mobile endpoint device 106 may be enabled with global positioning system (GPS) capabilities. Thus, the application 202 may identify one or more grocery stores nearby the GPS coordinates of the mobile endpoint device 106.

In one embodiment, by selecting a specific grocery store, the application 202 may retrieve information about the grocery store. For example, the information may include pricing of each food item 116 in the grocery store, a location of each food item 116 in the grocery store (e.g., an aisle number, shelf number or location, and the like), operating hours, and the like.

FIG. 3 illustrates an example screenshot of a scan menu 208. In one embodiment, the scan menu 208 may be organized by an example layout 310. For example, the scan menu 208 may include submenus food items, nutritional details and ingredients. The food items submenu may be further organized into additional submenus price and location. The nutritional details may be displayed similar to a nutritional detail label on food items 116. For example, the nutritional detail may include information, such as for example, calories, fat, carbohydrates, protein, vitamins, and the like. The ingredients may include all of the ingredients for the food item 116.

In one embodiment, the application 202 may automatically analyze the ingredients of the food item 116, comparing them to a list proscribed or preferred components (e.g., the filters pre-defined by the user), that is received in the food item data communication from the tag 118 associated with the respective food item. The application 202 may determine if any of the ingredients match any of the food items selected in the allergies submenu of the filters menu 204. If a match is found, these items may be filtered out and not displayed to the user 120 via his or her mobile endpoint device 106. However, if none of the ingredients of the food item 116 match any of the food items selected in the allergies submenu of the filters menu 204, the food item 116 may be presented to the user 120 as a recommended food item.

In one embodiment, the recommended food items may be displayed as illustrated in the screen shot of FIG. 3. For example, the recommended food items may include an information box 314 and a picture of the food item 116 in a window $312_1$ to $312_n$ (also herein referred to individually or collectively as windows 312). In an example illustrated in FIG. 3, as the user 120 is walking down the soup aisle 102 of the grocery store, the shelf talker 108 may be associated with Progresso® soup. The tag 118 of the shelf talker 108 may push or transmit a food item data communication containing information about the Progresso® soup to the mobile endpoint device 106 of the user 120. The application 202 running on the mobile endpoint device 106 may filter the information and determine that the Progresso® soup does not contain any ingredients that are identified as proscribed by the user's preferences or being filtered out by the user 120. As a result, the application 202 may display the Progresso® soup in the window $312_1$ as illustrated in FIG. 3.

The information box 314 may include a brand of the food item 116, the size of the food item 116, a location of the food item 116, a cost of the food item 116, and the like. In one embodiment, the application 202 may have a scrolling series of windows 312 that include food item recommendations based on the filter menu 204. The user 120 may swipe across the windows 312 to view the different food item recommendations that are identified based on the filter men 204 and/or a grocery shopping list, as discussed above. In one embodiment, the food items 116 in the windows 316 may change based on the food items located in an aisle 102 that the user 120 is walking down or as the proximity of different shelf talkers 108, 110, 112 and 114 changes relative to the mobile endpoint device 106 as the user 120 walks down an aisle 102.

In one embodiment, the windows 312 may be ordered or organized based on a location of the user 120. For example, when the user 120 is walking down the aisle 102, as the user 120 approaches a food item 116 that meets the food item filter requirements, the food item 116 may be displayed in the window $312_1$. The food items 116 that the user 120 is approaching in the aisle 120 may be queued in windows $312_2$ to $312_n$ to the right of the current window $312_1$. As the user 120 walks past the food item 116 in the window $312_1$, the window $312_1$ may be automatically moved to the left and the next food item 116 that is closes to the user 120 may be displayed in window $312_2$. Thus, windows 312 to the left may be food items 116 that the user 120 has passed down the aisle 102, the window 312 in the middle currently displaying a food item 116 may be located where the user 120 is located in the aisle 102 and the windows 312 to the right may be food items 116 that the user 120 is approaching as the user 120 walks down the aisle. In other words, the windows 312 may automatically scroll (e.g., right to left) as the user 120 walks down an aisle 102.

In one embodiment, the information box 314 may include a more button 316. The more button 316 may allow the user 120 to view other submenu categories of the scan menu 208 (e.g., the nutritional details and the ingredients details), discussed above.

In one embodiment, if the tags 118 are located on a menu of a restaurant, the scan menu 208 may show information and pictures of food items 116 on the menu. For example, the food items 116 that are recommended in the windows 316 may be pictures of the menu items. The nutritional details and ingredient details may be details of each food item on the menu of the restaurant. The information box 314 may include the name of the menu food item 116, price, serving size, location in the menu, and the like.

Figure 4:
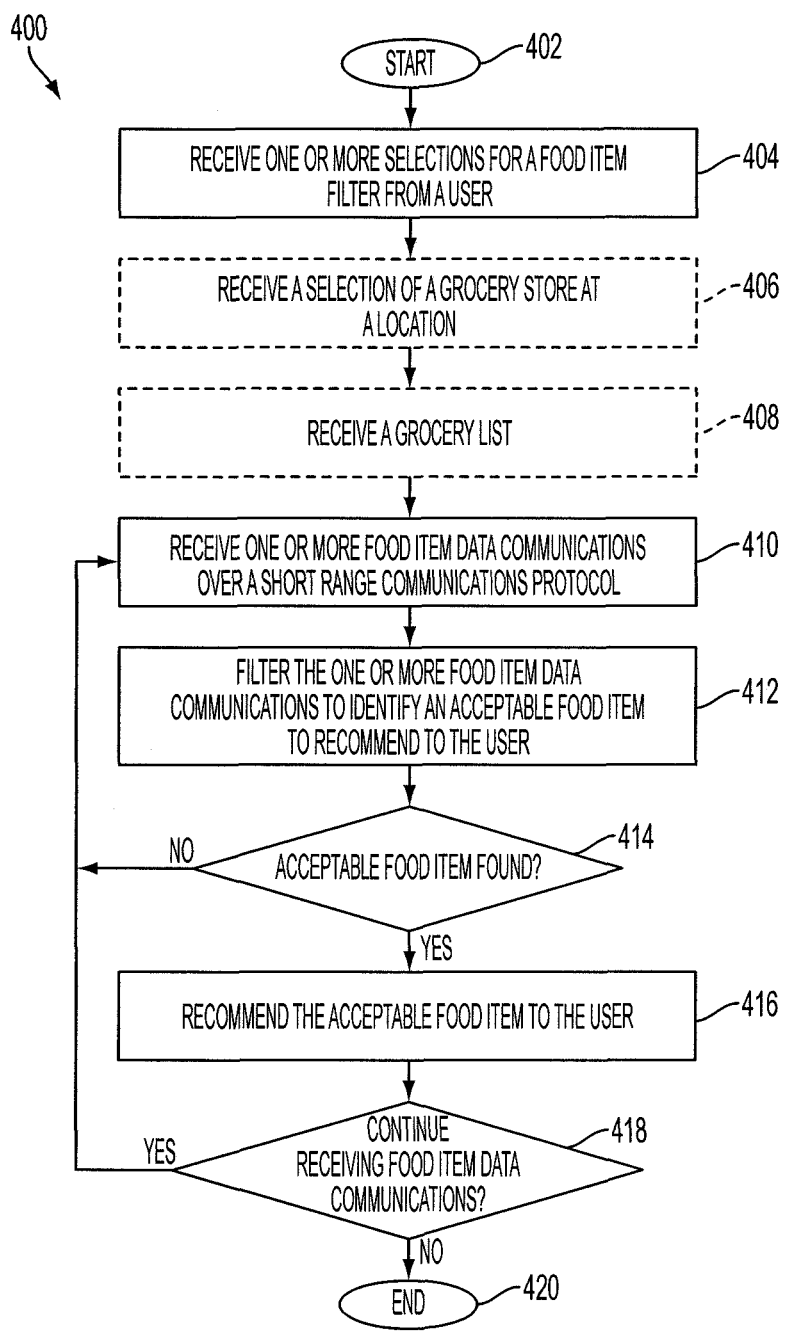
FIG. 4 illustrates an example flowchart of one embodiment of a method for recommending a food item.
Figure 5:
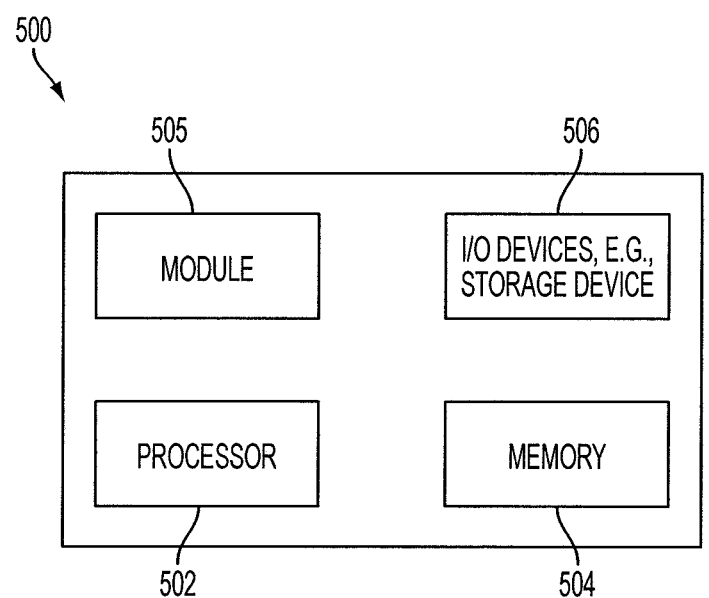
FIG. 5 illustrates a high-level block diagram of a general-purpose computer suitable for use in performing the functions described herein.

FIG. 4 illustrates a flowchart of a method 400 for recommending a food item. In one embodiment, one or more steps or operations of the method 400 may be performed by the mobile endpoint device 106 or a general-purpose computer as illustrated in FIG. 5 and discussed below.

At step 402 the method 400 begins. At step 404, the method 400 receives one or more selections for a food item filter from a user. For example, the user may select one or more dietary objectives and one or more food allergies or food items that the user is trying to avoid on food item filter of an application running on the mobile endpoint device of the user. In one embodiment, when the user selects one or more dietary objectives, the one or more food allergies or food items that the use is trying to avoid or trying to emphasize may be automatically selected.

At optional step 406, the method 400 may receive a selection of a grocery store at a location. For example, selecting the grocery store location may provide information such as, for example, a detailed layout of the grocery store, which food items are currently in stock, where the food items are located (e.g., an aisle number, a shelf number or location, and the like), and the like.

At optional step 408, the method 400 may receive a grocery list. For example, the application on the mobile endpoint device may include a grocery shopping list feature. Alternatively, the grocery list may be obtained from a third party grocery list application or program. The food items on the grocery list may be associated with a food category. As a result, when the mobile endpoint device 106 receives food item data communications that are not from a food category contained in the grocery list, the mobile endpoint device 106 may ignore the food item data communication, even if the food item may possibly be an acceptable or recommended food item.

At step 410, the method 400 receives one or more food item data communications over a short range communications protocol. For example, the grocery store may be equipped with shelf talkers that each have an NFC tag that communicate passively over the NFC protocol. The NFC tags may push food item data communications to the mobile endpoint device. In other words, the user is not required to manually scan each food item that the user is possibly interested in. Rather, the NFC tags on the shelf talkers push food item data communications to the user as the user is walking by the shelf talkers in an aisle of the grocery store.

The food item data communications may include various information about a respective food item. For example, the information regarding nutritional details about the food item, all the ingredients of the food item, a location of the food item, a price of the food item, a name of the food item, a picture of the food item, and the like.

At step 412, the method 400 filters the one or more food item data communications to identify an acceptable food item to recommend to the user. For example, the food item filters selected by the user in step 404 may be used to compare the ingredients of included in the food item data communications of a respective food item. A comparison may be made between the ingredients of the food item associated with the food item data communications that is received and the food items or ingredients selected by the user in the food item filer that the user is trying to avoid. Any food items that include ingredients that match food items that user is trying to avoid based on the food item filter may be filtered such that the food item is not displayed or recommended to the user.

At step 414, the method 400 determines if an acceptable food item is found based on the filtering in step 412. If an acceptable food item is not found, the method 400 may return to step 410 to continue receiving food item data communications. For example, one or more ingredients of the food item matched a food item in the food item filter that the user is trying to avoid.

However, if at step 414 the method 400 determines that an acceptable food item is found based on the filtering in step 412, the method 400 may proceed to step 416. For example, none of the ingredients of the food item match any of the food items in the food item filter that the user is trying to avoid. At step 416, the method 400 recommends the acceptable food item to the user.

At step 418, the method 400 determines if the user wants to continue receiving food item data communications. If the user desires to continue receiving food item data communications, the method 400 may return to step 410.

However, at step 418 if the user does not wish to continue receiving food item data communications, the method 400 may proceed to step 420. In one embodiment, the decision may be made passively. For example, if the method 400 does not receive any input for a predefined period of time, the method 400 may assume that the user does not wish to continue receiving food item data communications and close the application. At step 420, the method 400 ends.

It should be noted that although not explicitly specified, one or more steps, functions, or operations of the method 400 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 4 that recite a determining operation, or involve a decision, do not necessarily require that both branches of the determining operation be practiced. In other words, one of the branches of the determining operation can be deemed as an optional step.

FIG. 5 depicts an high-level block diagram of a general-purpose computer suitable for use in performing the functions described herein. As depicted in FIG. 5, the system 500 comprises one or more hardware processor elements 502 (e.g., a central processing unit (CPU), a microprocessor, or a multi-core processor), a memory 504, e.g., random access memory (RAM) and/or read only memory (ROM), a module 505 for recommending a food item, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for recommending a food item (e.g., a software program comprising computer-executable instructions) can be loaded into memory 504 and executed by hardware processor element 502 to implement the steps, functions or operations as discussed above in connection with the exemplary method 400. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for recommending a food item (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for recommending one or more acceptable food items, comprising:
   receiving, by a processor of a mobile endpoint device executing an application on the mobile endpoint device, one or more food item data communications over a short range communications protocol that are pushed to the mobile endpoint device and an identification of a grocery store;
   filtering, by the processor, the one or more food item data communications in accordance with a food item filter pre-defined by a user to identify the one or more acceptable food items to recommend to the user and a location of each one of the one or more acceptable food items based on the grocery store that is identified; and
   displaying, on the endpoint device by the processor, a scrolling series of a plurality of windows, wherein each one of the plurality of windows displays a different one of the one or more acceptable food items that are recommended based on the filtering, wherein the application organizes the plurality of windows in the scrolling series based on a location of the user in the grocery store and the location of the each one of the one or more acceptable food items and causes the plurality of windows to automatically scroll as the user moves down an aisle in the grocery store, wherein a middle window of the plurality of windows displays an acceptable food item of the one or more acceptable food items that is located where the user is located in the aisle, a first subset of windows left of the middle window are passed acceptable food items of the one or more acceptable food items that the user has passed in the aisle and a second subset of windows right of the middle window are approaching acceptable food items of the one or more acceptable food items that the user is approaching in the aisle.

2. The method of claim 1, wherein the short range communications protocol comprises a near field communications (NFC) protocol.

3. The method of claim 1, wherein the one or more food item data communications are transmitted by a shelf talker of each food item as the user walks down an aisle of the grocery store.

4. The method of claim 3, wherein the filtering further comprising:
   receiving, by the processor, a grocery list;
   identifying, by the processor, a food category of each item of a plurality of items on the grocery list and a current food category of the aisle the user is walking down in the grocery store; and
   filtering, by the processor, the one or more food item data communications in accordance with the food category for one of the plurality of items on the grocery list and the current food category of the aisle the user is walking down in the grocery store.

5. The method of claim 1, wherein the food item filter includes one or more dietary objectives based on at least one of: a religious preference, a cultural preference, a physical state, a dietary restriction or a disease and one or more specific food items.

6. The method of claim 5, wherein the one or more specific food items are automatically selected based on the one or more dietary objectives.

7. A non-transitory computer-readable medium storing a plurality of instructions which, when executed by a processor of a mobile endpoint device, cause the processor to execute an application on the mobile endpoint device for recommending one or more acceptable food itcm items, the application performing operations comprising:
   receiving one or more food item data communications over a short range communications protocol that are pushed to the mobile endpoint device and an identification of a grocery store;
   filtering the one or more food item data communications in accordance with a food item filter pre-defined by a user to identify the one or more acceptable food items to recommend to the user and a location of each one of the one or more acceptable food items based on the grocery store that is identified; and
   displaying a scrolling series of a plurality of windows, wherein each one of the plurality of windows displays a different one of the one or more acceptable food items that are recommended based on the filtering, wherein the application organizes the plurality of windows in the scrolling series based on a location of the user in the grocery store and the location of the each one of the one or more acceptable food items and causes the plurality of windows to automatically scroll as the user moves down an aisle in the grocery store, wherein a middle window of the plurality of windows displays an acceptable food item of the one or more acceptable food items that is located where the user is located in the aisle, a first subset of windows left of the middle window are passed acceptable food items of the one or more acceptable food items that the user has passed in the aisle and a second subset of windows right of the middle window are approaching acceptable food items of the one or more acceptable food items that the user is approaching in the aisle.

8. The non-transitory computer-readable medium of claim 7, wherein the short range communications protocol comprises a near field communications (NFC) protocol.

9. The non-transitory computer-readable medium of claim 7, wherein the one or more food item data communications are transmitted by a shelf talker of each food item as the user walks down an aisle of the grocery store.

10. The non-transitory computer-readable medium of claim 9, wherein the filtering further comprising:
   receiving a grocery list;
   identifying a food category of each item of a plurality of items on the grocery list and a current food category of the aisle the user is walking down in the grocery store; and
   filtering the one or more food item data communications in accordance with the food category for one of the plurality of items on the grocery list and the current food category of the aisle the user is walking down in the grocery store.

11. The non-transitory computer-readable medium of claim 7, wherein the food item filter includes one or more dietary objectives based on at least one of: a religious preference, a cultural preference, a physical state, a dietary restriction or a disease and one or more specific food items.

12. The non-transitory computer-readable medium of claim 11, wherein the one or more specific food items are automatically selected based on the one or more dietary objectives.

* * * * *